US010927289B2

(12) United States Patent
Reyes et al.

(10) Patent No.: US 10,927,289 B2
(45) Date of Patent: Feb. 23, 2021

(54) WATER-SOLUBLE CORROSION INHIBITOR FOR SUBTERRANEAN TREATMENTS (71) Applicant: Halliburton Energy Services, Inc., Houston, TX (US)

(72) Inventors: Enrique Antonio Reyes, Tomball, TX (US); Antonio Recio, III, Humble, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/484,794

(22) PCT Filed: Apr. 3, 2017

(86) PCT No.: PCT/US2017/025747
§ 371 (c)(1),
(2) Date: Aug. 8, 2019

(87) PCT Pub. No.: WO2018/186827
PCT Pub. Date: Oct. 11, 2018

(65) Prior Publication Data
US 2019/0359881 A1 Nov. 28, 2019

(51) Int. Cl.
*C09K 8/54* (2006.01)
*C09K 8/524* (2006.01)
(52) U.S. Cl.
CPC .............. *C09K 8/54* (2013.01); *C09K 8/524* (2013.01); *C09K 2208/32* (2013.01)
(58) Field of Classification Search
CPC ..................................................... E21B 43/02
See application file for complete search history.

(56) References Cited

U.S. PATENT DOCUMENTS 4,705,665 A * 11/1987 Malik ..................... C09K 8/74
134/3
8,372,336 B2 2/2013 Hellberg et al.
(Continued)

FOREIGN PATENT DOCUMENTS

EP 0333135 B1 12/1994
WO 2005028589 A1 3/2005
(Continued)

OTHER PUBLICATIONS

International Search Report and Written Opinion dated Feb. 13, 2018; International PCT Application No. PCT/US2017/025747.

*Primary Examiner* — Angela M DiTrani Leff
*Assistant Examiner* — Avi T Skaist
(74) *Attorney, Agent, or Firm* — McGuireWoods, LLP (57) ABSTRACT Provide are methods and systems for inhibiting corrosion of a metal surface. An example method comprises providing a treatment fluid comprising an aqueous carrier fluid and a polyhydroxyetheramine corrosion inhibitor; contacting the metal surface with the treatment fluid; and contacting the metal surface with a mineral acid. Another example method comprises providing a treatment fluid comprising an aqueous carrier fluid, a non-polyhydroxyetheramine corrosion inhibitor, and a polyhydroxyetheramine corrosion inhibitor intensifier; contacting the metal surface with the treatment fluid; and contacting the metal surface with an organic acid. An example system comprises a treatment fluid comprising a polyhydroxyetheramine, an acid, and an aqueous carrier fluid; mixing equipment capable of containing the treatment fluid; pumping equipment capable of pumping the treatment fluid into a wellbore; and the metal surface.

20 Claims, 2 Drawing Sheets

(56) References Cited

U.S. PATENT DOCUMENTS

| | | |
|---|---|---|
| 8,940,227 B2 | 1/2015 | Hellberg et al. |
| 9,228,089 B2 | 1/2016 | Hellberg et al. |
| 9,475,976 B2 | 10/2016 | Vasquez et al. |
| 2011/0005773 A1 | 1/2011 | Dusterhoft et al. |
| 2015/0197682 A1 | 7/2015 | Treybig |
| 2015/0307769 A1* | 10/2015 | Chang .................. E21B 43/283 166/308.2 |
| 2016/0137907 A1 | 5/2016 | Vo et al. |

FOREIGN PATENT DOCUMENTS

| | | | |
|---|---|---|---|
| WO | 2011000895 | A1 | 1/2011 |
| WO | 2012089649 | A1 | 7/2012 |
| WO | 2016190865 | A1 | 12/2016 |

* cited by examiner

WATER-SOLUBLE CORROSION INHIBITOR FOR SUBTERRANEAN TREATMENTS

TECHNICAL FIELD

The present disclosure relates to the use of polyhydroxyetheramines to inhibit corrosion of metal surfaces, and more particularly, to various systems and methods of using water-soluble polyhydroxyetheramines as corrosion inhibitors and corrosion inhibitor intensifiers during acid treatments in a subterranean formation.

BACKGROUND

Subterranean formations may be treated with various types of acids to stimulate the production of hydrocarbons therefrom. One stimulation method, generally referred to in the art as "acidizing," involves introducing an acid solution into a subterranean formation under pressure to induce the acid solution to flow through the pore spaces of the subterranean formation. The acid may dissolve any acid-soluble materials it contacts, increasing the size of the pore spaces and thereby increasing the permeability of the formation. Another stimulation method, generally referred to in the art as "fracture-acidizing" or "acid fracturing," involves the introduction of an acid solution above the formation-fracture pressure to etch the fracture faces with the flowing acid and form channels therein that remain open when the fractures close. The acid may also enlarge the pore spaces in the fracture faces and in the formation.

The acid solution used in these stimulation methods may cause corrosion of any metal surface that the acid solution contacts, (e.g., the metal surfaces of pumps, conduits, mixers, etc.) The corrosion of the metal surfaces may be further exacerbated by the elevated temperatures of the subterranean formations. Replacement of corroded equipment increases operational expenditures and downtime. Further, the corrosion may also result in at least the partial consumption of the acid. This may result in needing additional acid and additives to complete an operation, inducing even more corrosion, and increasing operational expenses.

Corrosion inhibitors may be used to inhibit corrosion of metal surfaces by acid solutions. Problems with corrosion inhibitors may arise when the corrosion inhibitors maintain an improper hydrophilic-lipophilic balance. For example, quaternary amine corrosion inhibitors may comprise lipophilic nonpolar portions and hydrophilic charged polar portions. Some of these corrosion inhibitors may be too hydrophobic for some applications and may separate from the aqueous phase of a treatment fluid. This phase separation can result in decreased corrosion inhibition. To counter this result, surfactants may be added to reduce the risk of phase separation. However, the use of surfactants may result in other problems. For example, some surfactants are incompatible with a subterranean formation and can cause formation damage. Some surfactants may be incompatible with the treatment fluid or other treatment fluid additives. Additionally, the use of surfactants in general increases fluid complexity and operational expenses.

BRIEF DESCRIPTION OF THE DRAWING

Illustrative examples of the present disclosure are described in detail below with reference to the attached drawing figure, which is incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates to the use of polyhydroxyetheramines to inhibit corrosion of metal surfaces, and more particularly, to various systems and methods of using water-soluble polyhydroxyetheramines as corrosion inhibitors and corrosion inhibitor intensifiers during acid treatments in a subterranean formation.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. When "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods and systems described herein comprise the use of a treatment fluid comprising a polyhydroxyetheramine. The treatment fluid may be introduced into a wellbore penetrating a subterranean formation. The subterranean formation may be a subterranean formation subject to or intended to be subject to an acid solution, (e.g., in a stimulation operation such as acidizing or acid fracturing). In some examples, the treatment fluid comprising the polyhydroxyetheramine may further comprise the acid solution. In some alternative examples, the treatment fluid comprising the polyhydroxyetheramine may not comprise the acid solution. The polyhydroxyetheramine may coat at least a portion of a metal surface, (e.g., an iron or steel surface). The coating may inhibit corrosion of the metal surface from an acid solution comprising a mineral acid, (e.g., hydrochloric acid). As another example, the polyhydroxyetheramine may function as a corrosion inhibitor intensifier, and the polyhydroxyetheramine coating on the metal surface may increase the efficacy of a corrosion inhibitor against corrosion from organic acids, (e.g., formic acid). The polyhydroxyetheramine is water-miscible and water-soluble and does not require a surfactant or solvent (other than the aqueous carrier fluid) to dissolve. As such, the probability that the polyhydroxyetheramine will separate from the aqueous carrier fluid is greatly reduced.

The example treatment fluids comprise a polyhydroxyetheramine. The polyhydroxyetheramine is a branched water-soluble polyhydroxyetheramine. The polyhydroxyetheramine may comprise polyalkylene oxide sidechains. In some examples, the polyhydroxyetheramine may be cross-linked. In some examples, the polyhydroxyetheramine may be provided in the form of a salt. In some alternative examples, the polyhydroxyetheramine may be provided in the form of a solution. The polyhydroxyetheramine may have a molecular weight in the range of about 1000 to about 500,000, alternatively, in a range of about 2000 to about 250,000, or further alternatively, in a range of about 5000 to about 100,000. The polyhydroxyetheramine is a polyether and may comprise no or very few polyamine linkages, unlike quaternary amines. As such, the polyhydroxyetheramine does not rely on a large amount of cationic charges to provide a coating to a substrate.

Without limitation, the synthesis reactions provided below are presented merely to illustrate various processes of producing a suitable polyhydroxyetheramine and are not to be construed as to limit the scope of the polyhydroxyetheramine, the disclosure, and the methods and systems described herein.

As an example, the polyhydroxyetheramine may be synthesized by reacting a primary amine, a bis(secondary) diamine, a mono-amine-functionalized poly(alkylene oxide), or a mixture thereof with a diglycidyl ether, a diepoxy-functionalized poly(alkylene oxides), or a mixture thereof. Optionally, the resulting polyhydroxyetheramine may be reacted with one or more amines having two reactive hydrogen atoms to impart cross-linking. Optionally, the resulting polyhydroxyetheramine may be reacted with an acid or alkylating agent to form a salt.

As another example, the polyhydroxyetheramine may be synthesized by reacting an equivalent or excess of a difunctional amine or a mixture thereof with an excess or equivalent amount of a diglycidyl ether of a bisphenol or a mixture thereof. Optionally, this reaction may be done in the presence of a monofunctional nucleophile that functions as a terminating agent. Optionally, this reaction may be done in the presence of a catalyst and/or a solvent. Optionally, the resulting polyhydroxyetheramine may be reacted with one or more amines having two reactive hydrogen atoms to impart cross-linking. Optionally, the resulting polyhydroxyetheramine may be reacted with an acid or alkylating agent to form a salt.

As another example, the polyhydroxyetheramine may be synthesized by dissolving in an organic or non-organic solvent: an amine selected from the group consisting of primary amine, a bis(secondary) diamine, or a mono-amine-functionalized poly(alkylene oxide) or a mixture thereof; adding to the amine solution an epoxide selected from the group consisting of a diglycidyl ether, a diepoxy-functionalized poly(alkylene oxides) or mixture thereof in an amine hydrogen equivalent to epoxide equivalent ratio of from 1.01:1 to 1.1:1. Optionally, the resulting polyhydroxyetheramine may be reacted with one or more amines having two reactive hydrogen atoms to impart cross-linking. Optionally, the resulting polyhydroxyetheramine may be reacted with an acid or alkylating agent to form a salt.

As another example, the polyhydroxyetheramine may be synthesized by reacting a diepoxide or a mixture of diepoxides and multi-epoxide compounds with one or more alkylene oxide functionalized amines or a mixture of one or more alkylene oxide functionalized amines and one or more amines. Optionally, the resulting polyhydroxyetheramine may be reacted with one or more amines having two reactive hydrogen atoms to impart cross-linking. Optionally, the resulting polyhydroxyetheramine may be reacted with an acid or alkylating agent to form a salt.

As another example, the polyhydroxyetheramine may be synthesized by reacting a mixture of diepoxide and one or more aliphatic or aromatic triepoxides with one or more alkylene oxide functionalized amines or a mixture of one or more alkylene oxide functionalized amines and one or more fatty amines. Optionally, the resulting polyhydroxyetheramine may be reacted with one or more amines having two reactive hydrogen atoms to impart cross-linking. Optionally, the resulting polyhydroxyetheramine may be reacted with an acid or alkylating agent to form a salt.

As another example, the polyhydroxyetheramine may be synthesized by reacting an amine having two reactive hydrogen atoms with a diepoxide to form a polyhydroxyetheramine; then reacting the polyhydroxyetheramine with an N-alkylating agent to form a water-soluble branched polyhydroxyetheramine. Optionally, one or more aliphatic triepoxides may be added simultaneously with the diepoxide. Optionally, the resulting polyhydroxyetheramine may be reacted with one or more amines having two reactive hydrogen atoms to impart cross-linking. Optionally, the resulting polyhydroxyetheramine may be reacted with an acid or alkylating agent to form a salt.

As another example, the polyhydroxyetheramine may be synthesized by the reaction of bisphenol A (a diepoxy compound), an ethanol amine, a diethanol amine, and a JEFFAMINE™ (i.e. a family of commercially available polyetheramines). JEFFAMINE is a registered trademark of Huntsman International LLC.

In some examples, the polyhydroxyetheramine may be synthesized to comprise secondary amine, tertiary amine, or ditertiary amine end groups if desired.

Some specific examples of the polyhydroxyetheramine include, but are not limited to, a diethanolamine capped ethanolamine/diglycidyl ether of neopentyl glycol copolymer grafted with epichlorohydrin terminated polyethyleneglycol methyl ether; an N,N,N'-trimethyl-1,3-propanediamine capped ethanolamine/3 (dimethylamino) propylamine/diglycidyl ether of neopentyl glycol terpolymer grafted with epichlorohydrin terminated polyethyleneglycol methyl ether polymer; a diethanolamine capped 3-(dimethylamino)propylamine/ethanolamine/poly (ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; the like; derivatives thereof; or mixtures thereof. Depending upon the type of acid (i.e. mineral or organic) selected for the acid treatment, the polyhydroxyetheramine may be used to inhibit corrosion of a metal surface directly as a corrosion inhibitor or indirectly as a corrosion inhibitor intensifier. As such, the concentration of the provided polyhydroxyetheramine in the treatment fluid may vary depending on this intended use. Moreover, the additional components of the treatment fluid may vary depending on this intended use. For example, if the polyhydroxyetheramine is to be used as a corrosion inhibitor intensifier, a non-polyhydroxyetheramine corrosion inhibitor may be added to the treatment fluid as well as additional solvents and/or surfactants to maintain the non-polyhydroxyetheramine corrosion inhibitor in the desired phase of the treatment fluid. These components may not be present in some examples where the polyhydroxyetheramine is to be used as the corrosion inhibitor.

In some examples, the polyhydroxyetheramine may be used as a corrosion inhibitor to inhibit the corrosion of metal surfaces from corrosion caused by a mineral acid. The polyhydroxyetheramine may be sufficient for inhibiting corrosion from mineral acid treatments without the need for a co-inhibitor or a corrosion inhibitor intensifier; however, optional co-inhibitors or corrosion inhibitor intensifiers may be added to the treatment fluid if desired. Examples of mineral acids may include, but are not limited to, hydrochloric acid, hydrofluoric acid, sulfuric acid, sulfamic acid, nitric acid, phosphoric acid, and the like.

In examples comprising the use of a polyhydroxyetheramine as a corrosion inhibitor, the concentration of the polyhydroxyetheramine in the treatment fluid may range from about 0.05% (w/v) of the treatment fluid to about 5.0% (w/v) of the treatment fluid. The concentration of the polyhydroxyetheramine in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the polyhydroxyetheramine in the treatment fluid may be about 0.05% (w/v) of the treatment fluid, about 0.1% (w/v) of the treatment fluid, about 0.5% (w/v) of the treatment fluid, about 1% (w/v) of the treatment fluid, about 2% (w/v) of the treatment fluid, about 2.5% (w/v) of the treatment fluid, about 3% (w/v) of the treatment fluid, about 4% (w/v) of the treatment fluid, or about 5% (w/v) of the treatment fluid. With the benefit of this disclosure, one of ordinary skill in the art will be able to obtain and prepare a treatment fluid comprising the polyhydroxyetheramine for a given application.

In some examples, the polyhydroxyetheramine may be used as a corrosion inhibitor intensifier to assist a corrosion inhibitor in inhibiting the corrosion of metal surfaces caused by an organic acid. The polyhydroxyetheramine may not be sufficient for inhibiting corrosion from organic acids by itself; however, and without limitation by theory, the coating properties of the polyhydroxyetheramine may allow the formation of interfacial bridges between the metal surface and the corrosion inhibitor that may result in an increase in efficacy of a non-polyhydroxyetheramine corrosion inhibitor. In some examples, the corrosion inhibitor intensifiers do not possess an inhibitory effect by themselves; further, the corrosion inhibitor intensifiers are used at a fractional concentration of the corrosion inhibitor. Examples of organic acids may include, but are not limited to, formic acid, acetic acid, propionic acid, butyric acid, methanesulfonic, citric acid, chloroacetic acid, alkysulfonic acid, and the like. In examples where the acid treatment is to be an organic acid, the polyhydroxyetheramine, as a corrosion inhibitor intensifier, may be added to the same treatment fluid with the corrosion inhibitor. Examples of corrosion inhibitors sufficient for use with a polyhydroxyetheramine corrosion inhibitor intensifier include, but are not limited to acetylenic alcohols, aromatic aldehydes, alkenylphenones, amines, amides, nitrogen-containing heterocycles (e.g., imidazoline-based), nitriles, imminium salts, triazoles, pyridine and its derivatives or salts, quinoline derivatives, thiourea derivatives, thiosemicarbazide, thiocyanates, quaternary salts, propargyl alcohol, cinnamaldehyde, pyridinium benzyl quaternary chloride, benzoin and benzyl compounds, tributylamine, aniline, acetamide derivatives, isoxazolidine derivatives, isoxazoline derivatives, thiosemicarbazide compounds, n-octylamine, diphenylamine, dodecylamine, di-n-butylamine, cyclohexylamine, 1,3-dibutyl-2-thiourea, furfuryl alcohol, octyl alcohol, benzimidazole, 2-aminobenzimidazole, 2-mercaptobenzimidazole, 1-benzylbenzimidazol, 1,2-dibenzylbenzimidazole, 2-aminomethylbenzimidazole, bis(benzimidazol-2-ylethyl)sulphide, 1,12-bis(1,2,4-triazolyl)dodecane, 3-(4-amino-2-methyl-5-pyrimidylmethyl)-4-methyl thiazolium chloride, 1-(2-pyridylazo)-2-naphthol, 4-(20-amino-50-methylphenylazo) antipyrine, 3-undecane-4-aryl-5-mercapto-1,2,4-triazole, 3 (heptadeca-8-ene)-4-aryl-5-mercapto-1,2,4-triazole, 3 (deca-9-ene)-4-aryl-5-mercapto-1,2-4-triazole, 2-undecane-5-mercapto-1-oxa-3,4-diazole, 2-heptadecene-5-mercapto-1-oxa-3,4-diazole, 2-decene-5-mercapto-1-oxa-3,4-diazole, 3,5-diphenyl-imino-1,2,4-dithiazolidine, 3-phenylimino-5-chlorophenyl-imino-1,2,4-dithiazolidine, 3-phenyl-imino-5-tolyl-imino-1,2,4-dithiazolidine, 3-phenyl-imino-5-anisidylimino-1,2,4-dithiazolidine, 1-cinnamylidine-3-thiocarbohydrazide, 1,10-dicinnamylidine-3-thiocarbohydrazide, the like, or any combination thereof.

In examples comprising the use of a polyhydroxyetheramine as a corrosion inhibitor intensifier, the concentration of the polyhydroxyetheramine in the treatment fluid may range from about 0.05% (w/v) of the treatment fluid to about 1% (w/v) of the treatment fluid. The concentration of the polyhydroxyetheramine in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the polyhydroxyetheramine in the treatment fluid may be about 0.05% (w/v) of the treatment fluid, about 0.07% (w/v) of the treatment fluid, about 0.09% (w/v) of the treatment fluid, about 0.1% (w/v) of the treatment fluid, about 0.2% (w/v) of the treatment fluid, about 0.5% (w/v) of the treatment fluid, about 0.7% (w/v) of the treatment fluid, or about 1% (w/v) of the treatment fluid. With the benefit of this disclosure, one of ordinary skill in the art will be able to obtain and prepare a treatment fluid comprising the polyhydroxyetheramine for a given application.

In some examples, an acid may be added to the treatment fluids. The acid may be any acid sufficient for the desired acidizing or acid fracturing operation. Generally, the acid may be a mineral acid or an organic acid. Examples of mineral acids include, but are not limited to, hydrochloric acid, nitric acid, phosphoric acid, sulfuric acid, sulfamic acid, boric acid, hydrofluoric acid, hydrobromic acid, perchloric acid, hydroiodic acid, the like, and any combination thereof. Examples of organic acids include, but are not limited to, methanesulfonic acid, formic acid, acetic acid, propionic acid, butyric acid, valeric acid, caproic acid, oxalic acid, lactic acid, malic acid, citric acid, benzoic acid, carbonic acid, chloroacetic acid, alkysulfonic acid, the like, and any combination thereof. In some alternative examples, the treatment fluid may not comprise the acid. For example, the treatment fluid may be used to pre-coat the metal surfaces prior to the introduction of the acid. In these examples, the acid may be introduced subsequently in a distinct treatment fluid that may also comprise a polyhydroxyetheramine. In preferred examples, the polyhydroxyetheramine will be fully compatible and miscible with both the acid and the spent acid.

The concentration of the acid in the treatment fluid may range from about 1% (w/v) of the treatment fluid to about 38% (w/v) of the treatment fluid. The concentration of the acid in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the acid in the treatment fluid may be about 1% (w/v) of the treatment fluid, about 5% (w/v) of the treatment fluid, about 10% (w/v) of the treatment fluid, about 15% (w/v) of the treatment fluid, about 20% (w/v) of the treatment fluid, about 25% (w/v) of the treatment fluid, about 30% (w/v) of the treatment fluid, or about 38% (w/v) of the treatment fluid. With the benefit of this disclosure, one of ordinary skill in the art will be able to obtain and prepare a treatment fluid comprising the acid for a given application.

In all examples, the treatment fluids comprise an aqueous carrier fluid to transport the polyhydroxyetheramine to the desired interval of the subterranean formation. The aqueous carrier fluid may generally be from any source. In various examples, the aqueous carrier fluid may comprise fresh water, salt water, seawater, brine, or an aqueous salt solution. In some embodiments, the aqueous carrier fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like.

In all examples, the polyhydroxyetheramine is fully water-soluble and does not require the addition of additives such as surfactants, dispersing agents, and/or co-solvents to the treatment fluid to dissolve the polyhydroxyetheramine in the aqueous carrier fluid. The PHEA is soluble in all fractions of PHEA per unit volume of water (100-mL) in the range of 50% wt. of PHEA to 0.05% wt., per unit volume. Typical concentrations of PHEA is 30 to 20% wt. in water. These additives may be added to the treatment fluid to assist in the dissolution of other components, (e.g., non-polyhydroxyetheramine corrosion inhibitors); however, their inclusion is not a function of the specific polyhydroxyetheramine present. Further, the polyhydroxyetheramine does not require the use of complexing or stabilizing agents to scavenge dissolved iron. The polyhydroxyetheramine is capable of complexing with the dissolved iron ions without the use of iron-scavenging additives. As such, some examples of the treatment fluid may not comprise iron-scavenging additives.

The treatment fluids disclosed herein provide corrosion inhibition and remain stable at temperatures between about 100° F. to about 380° F. Further, the treatment fluids may provide corrosion inhibition at temperatures in the noted temperature range for a time of up to about 72 hours. In examples where the treatment fluid is to be used to provide corrosion inhibition at high temperatures (i.e. temperatures greater than about 140° F.), an optional co-inhibitor comprising a halide (e.g., iodide, bromide, etc.) and/or CO (in the form of formic acid, formate slats, formaldehyde, paraformaldehyde) moiety may be added to the treatment fluid. The high-temperature co-inhibitor may be added in examples where the polyhydroxyetheramine is used as a corrosion inhibitor or in examples where the polyhydroxyetheramine is used as a corrosion inhibitor intensifier. Examples of the high temperature co-inhibitors include, but are not limited to, tetrahydrofurfuryl alcohol. The treatment fluids may be used to prevent the acidic corrosion of metal surfaces.

The metal surfaces may include, but are not limited to, iron, iron alloys, steel, carbon steel, nickel alloys, and combinations thereof. Specific examples of metal surfaces include, but are not limited to, carbon steel of grades X65, P110, N80, etc.; steel grades of 306, 316, etc.; nickel alloys of grade Inconel 825, and the like.

The present disclosure provides methods and systems for treating metal surfaces disposed in a subterranean formation with a treatment fluid comprising a polyhydroxyetheramine. The methods may include pumping the treatment fluid in a wellbore penetrating a subterranean formation. The methods may also include contacting a metal surface disposed within the wellbore to deposit the polyhydroxyetheramine on the metal surface to form a coated metal surface. The coating may inhibit the corrosion of the metal surface or may increase the efficacy of a corrosion inhibitor in inhibiting the corrosion of the metal surface. The systems may include pumping and mixing equipment to convey the treatment fluid to the interval of the wellbore comprising the target metal surface.

As an example, the systems can comprise a pump fluidly coupled to a tubular, the tubular containing a treatment fluid comprising a polyhydroxyetheramine as described herein. The pump may be a high-pressure pump. As used herein, the term "high pressure pump" will refer to a pump that is capable of delivering a fluid downhole at a pressure of about 1000 psi or greater. A high-pressure pump may be used when it is desired to introduce the treatment fluid to a subterranean formation at or above a fracture gradient of the subterranean formation, but it may also be used in cases where fracturing is not desired. In some examples, the high-pressure pump may be capable of fluidly conveying particulate matter, such as proppant particulates, into the subterranean formation. Suitable high-pressure pumps will be known to one having ordinary skill in the art and may include, but are not limited to, floating piston pumps and positive displacement pumps. In other examples, the pump may be a low-pressure pump. As used herein, the term "low pressure pump" will refer to a pump that operates at a pressure of about 1000 psi or less. In some examples, a low-pressure pump may be fluidly coupled to a high-pressure pump that is fluidly coupled to the tubular. That is, the low-pressure pump may be configured to convey the treatment fluid to the high-pressure pump. In such examples, the low-pressure pump may "step up" the pressure of the treatment fluid before it reaches the high-pressure pump.

In some examples, the systems described herein may further comprise a mixing tank that is upstream of the pump and is the vessel in which the treatment fluid is formulated. In various examples, the pump (e.g., a low-pressure pump, a high-pressure pump, or a combination thereof) may convey the treatment fluid from the mixing tank or other source of the treatment fluid to the tubular. In other examples, however, the treatment fluid may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 1:
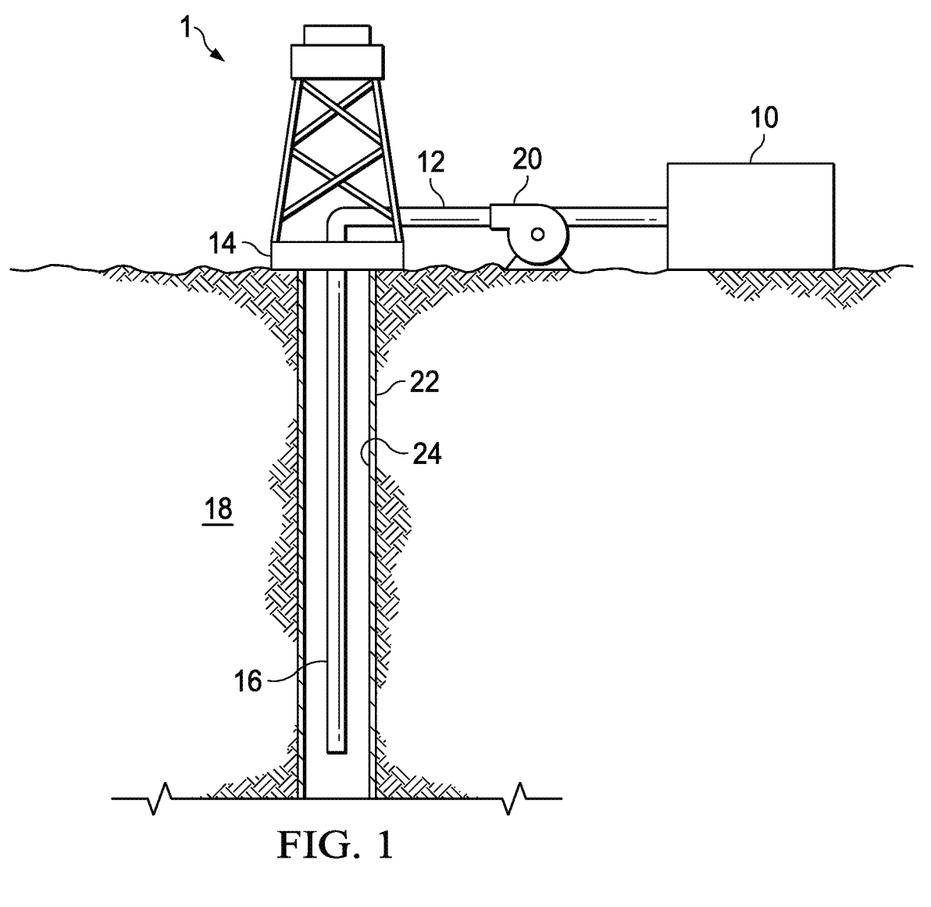
FIG. 1 is a schematic illustrating the surface and near-surface portions of a system to deliver a treatment fluid to a downhole location according to one or more examples.

FIG. 1 illustrates a schematic of the surface and near-surface portions of a system that can deliver the treatment fluids described herein to a downhole location, according to one or more examples. It should be noted that while FIG. 1 generally depicts a land-based system, it is to be recognized that like systems may be operated in subsea locations as well. As depicted in FIG. 1, system 1 may include mixing tank 10, in which a treatment fluid as described herein may be formulated. The treatment fluid may be conveyed via line 12 to wellhead 14, where the treatment fluid enters tubular 16. Tubular 16 may extend from wellhead 14 into a wellbore 22 penetrating subterranean formation 18. Wellbore 22 may be any type of wellbore including vertical, horizontal, deviated, etc. The illustrated portion of wellbore 22 is cased with a casing 24. It is to be understood that in some examples wellbore 22 may be uncased. Upon being ejected from tubular 16, the treatment fluid may subsequently penetrate into subterranean formation 18 as described in FIG. 2 below. Pump 20 may be configured to raise the pressure of the treatment fluid to a desired degree before its introduction into tubular 16. The treatment fluid prepared and conveyed by the system 1 components (e.g., mixing tank 10, tubular 16, pump 20, etc.) comprises a polyhydroxyetheramine as described herein. The polyhydroxyetheramine may be used to inhibit acid corrosion in the system 1 components when said components are contacted with an acid. In some examples, the treatment fluid may further comprise the acid.

Although not depicted in FIG. 1, the treatment fluid may, in some examples, flow back to wellhead 14 and exit subterranean formation 18. In some examples, the treatment fluid that has flowed back to wellhead 14 may subsequently be recovered and recirculated to subterranean formation 18.

Figure 2:
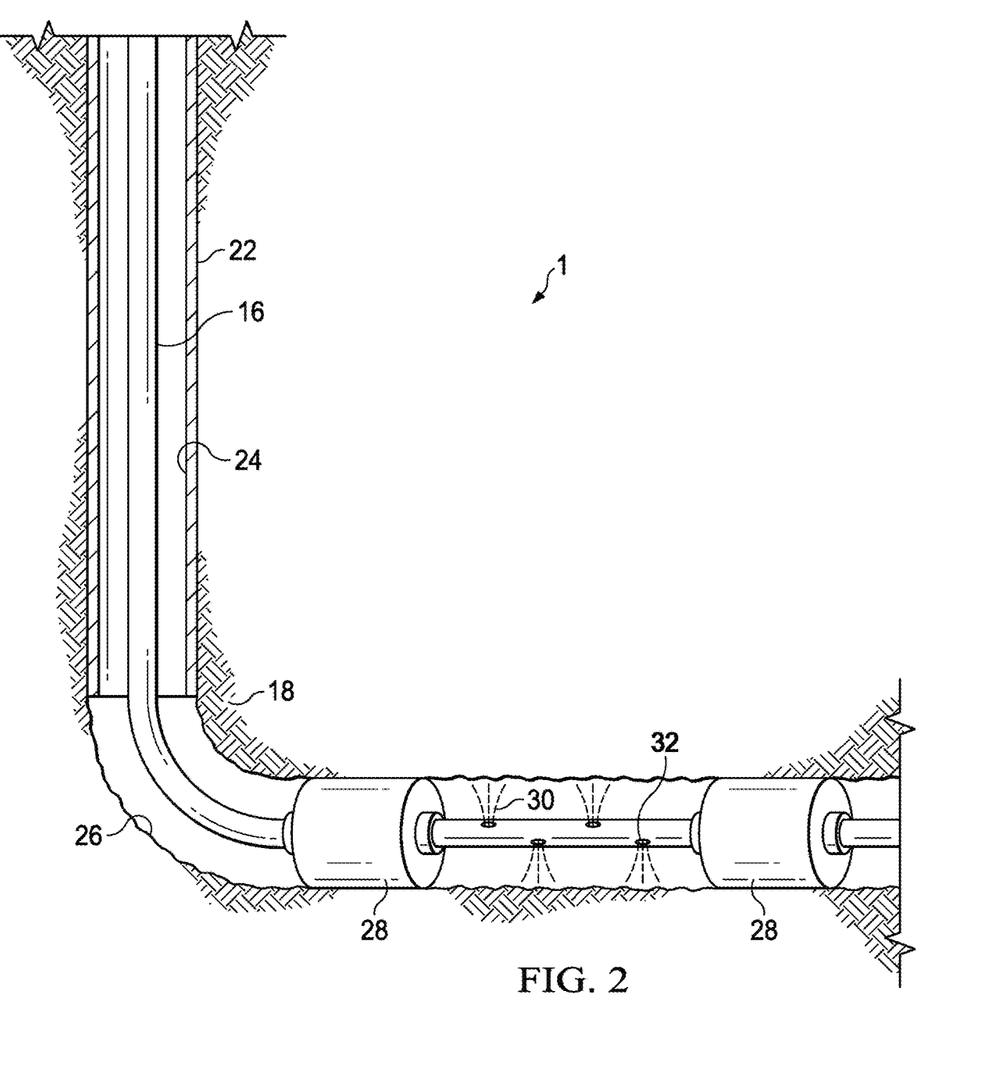
FIG. 2 is a schematic illustrating the downhole portion of the system illustrated in FIG. 1, according to one or more examples.

FIG. 2 illustrates a schematic of the downhole portion of the system 1 illustrated in FIG. 1, according to one or more examples. As depicted in FIG. 2, tubular 16 extends from the wellhead 14 (as illustrated in FIG. 1) into wellbore 22 penetrating subterranean formation 18. After descending through the heel 26 of the wellbore 22, tubular 16 may be coupled to one or more packers 28 positioned to isolate an interval of wellbore 22. A treatment fluid 30, as described herein, may exit tubular 16 through openings 32. The treatment fluid 30 comprises a polyhydroxyetheramine as described herein, and may be used to inhibit acid corrosion in the downhole components of system 1, when said components are contacted with an acid. In the illustrated example, treatment fluid 30 further comprises an acid, and upon being ejected from tubular 16, the treatment fluid 30 may subsequently penetrate into subterranean formation 18 to perform an acidizing operation. It is to be recognized that system 1 is merely exemplary in nature, and various additional components may be present that have not necessarily been depicted in FIGS. 1 and 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1 and 2.

EXAMPLES

The present disclosure can be better understood by reference to the following examples, which are offered by way of illustration. The present disclosure is not limited to the examples given herein.

Example 1

Example 1 is a comparative example that measured the corrosion rates of metal surface samples that have been treated with either a polyhydroxyetheramine corrosion inhibitor or a non-polyhydroxyetheramine corrosion inhibitor. The corrosion rates of NT-90 high-strength carbon steel samples were measured after exposure to a simulated treatment fluid of an aqueous mixture of 15% HCl acid at various temperatures. The experimental, comparative, and control treatment fluid samples comprised the noted acid and also varying concentrations of either a polyhydroxyetheramine corrosion inhibitor (presented as "PHEA" in Table 1 below), an aldehydic blend corrosion inhibitor which also comprised ethoxylated fatty acids (presented as "AB" in Table 1 below), or no corrosion inhibitor respectively. The NT-90 carbon steel samples were then suspended in the treatment fluid samples and placed in a high-temperature and high-pressure corrosion autoclave reactor. The NT-90 carbon steel samples remained in the autoclave for varying periods. The NT-90 carbon steel samples were then removed, cleaned, and weighed to obtain their weight loss. The corrosion value is reported in lbm/ft2. The amount of free iron generated was also measured. The results of the tests are provided below in Table I.

TABLE 1

Corrosion Inhibition with a Polyhydroxyetheramine

| Sample No. | Inhibitor | Temp (° F.) | Period (Hr.) | Corrosion mass loss rate (lbm/ft$^2$) | Fe produced (mg/L) |
|---|---|---|---|---|---|
| 1 | 2% PHEA | 160 | 18 | 0.0250 | 6,309 |
| 2 | 2% PHEA | 160 | 18 | 0.0257 | 4,440 |
| 3 | 2% PHEA | 160 | 18 | 0.0274 | 4,504 |
| 4 | 2% PHEA | 130 | 18 | 0.0132 | 1,617 |
| 5 | 0.5% AB | 160 | 18 | 0.0281 | 3,739 |
| 6 | 1.4% AB | 160 | 24 | 0.0150 | n/a |
| 7 | 2% PHEA | 160 | 68 | 0.1009 | 26,952 |
| 8 | 2% PHEA | 160 | 68 | 0.1128 | 29,684 |
| 9 | 2% PHEA | 160 | 68 | 0.1182 | 30,865 |
| 10 | None | 160 | 68 | 0.4724 | 142,353 |

Provided are methods for inhibiting corrosion on a metal surface in accordance with the disclosure and the illustrated FIGURES. An example method comprises providing a treatment fluid comprising an aqueous carrier fluid and a polyhydroxyetheramine corrosion inhibitor; contacting the metal surface with the treatment fluid; and contacting the metal surface with a mineral acid. The treatment fluid may further comprise the mineral acid. The polyhydroxyetheramine corrosion inhibitor may be selected from the group consisting of a diethanolamine capped ethanolamine/diglycidyl ether of neopentyl glycol copolymer grafted with epichlorohydrin terminated polyethyleneglycol methyl ether; an N,N,N-trimethyl-1,3-propanediamine capped ethanolamine/3 (dimethylamino)propylamine/diglycidyl ether of neopentyl glycol terpolymer grafted with epichlorohydrin terminated polyethyleneglycol methyl ether polymer; a diethanolamine capped 3-(dimethylamino)propylamine/ethanolamine/poly(ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; or a mixture thereof. The metal surface may have less corrosion relative to the same type of metal surface contacted with the same mineral acid for the same amount of time and at the same temperature. The mineral acid may be a mineral acid selected from the group consisting of hydrochloric acid, nitric acid, phosphoric acid, sulfuric acid, sulfamic acid, boric acid, hydrofluoric acid, hydrobromic acid, perchloric acid, hydroiodic acid, and any combination thereof. The treatment fluid may not comprise any other corrosion inhibitor other than the polyhydroxyetheramine corrosion inhibitor. The polyhydroxyetheramine corrosion inhibitor may have a saturation point of at least 40% w/v in the aqueous carrier fluid. The metal surface may be positioned in a wellbore; wherein the wellbore may have a temperature of between about 100° F. to about 380° F. at the location where the metal surface is positioned. The treatment fluid may further comprise tetrahydrofurfuryl alcohol. The concentration of the polyhydroxyetheramine corrosion inhibitor in the treatment fluid may be between about 0.05% (w/v) to about 5% (w/v).

Provided are methods for inhibiting corrosion on a metal surface in accordance with the disclosure and the illustrated FIGURES. An example method comprises providing a treatment fluid comprising an aqueous carrier fluid, a non-polyhydroxyetheramine corrosion inhibitor, and a polyhydroxyetheramine corrosion inhibitor intensifier; contacting the metal surface with the treatment fluid; and contacting the metal surface with an organic acid. The treatment fluid may further comprise the organic acid. The polyhydroxyetheramine corrosion inhibitor intensifier may be selected from the group consisting of a diethanolamine capped ethanolamine/diglycidyl ether of neopentyl glycol copolymer grafted with epichlorohydrin terminated polyethyleneglycol methyl ether; an N,N,N'-trimethyl-1,3-propanediamine capped ethanolamine/3 (dimethylamino)propylamine/diglycidyl ether of neopentyl glycol terpolymer grafted with epichlorohydrin terminated polyethyleneglycol methyl ether polymer; a diethanolamine capped 3-(dimethylamino)propylamine/ethanolamine/poly(ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; or a mixture thereof. The metal surface may have less corrosion relative to the same type of metal surface contacted with the same organic acid for the same amount of time and at the same temperature. The organic acid may be an organic acid selected from the group consisting of methanesulfonic acid, formic acid, acetic acid, propionic acid, butyric acid, valeric acid, caproic acid, oxalic acid, lactic acid, malic acid, citric acid, benzoic acid, carbonic acid, chloroacetic acid, alkysulfonic acid, and any combination thereof. The concentration of the polyhydroxyetheramine corrosion inhibitor intensifier in the treatment fluid may be between about 0.01% (w/v) to about 1% (w/v). The polyhydroxyetheramine corrosion inhibitor intensifier may have a saturation point of at least 40% w/v in the aqueous carrier fluid. The metal surface may be positioned in a wellbore; wherein the wellbore may have a temperature of between about 100° F. to about 380° F. at the location where the metal surface is positioned.

Provided are systems for inhibiting corrosion on a metal surface in accordance with the disclosure and the illustrated FIGURES. An example system comprises a treatment fluid comprising a polyhydroxyetheramine, an acid, and an aqueous carrier fluid; mixing equipment capable of containing the treatment fluid; pumping equipment capable of pumping the treatment fluid into a wellbore; and the metal surface. The treatment fluid may further comprises a non-polyhydroxyetheramine corrosion inhibitor. The treatment fluid may not comprise any other corrosion inhibitor other than the polyhydroxyetheramine corrosion inhibitor. The acid may be a mineral acid. The polyhydroxyetheramine may be selected from the group consisting of a diethanolamine capped ethanolamine/diglycidyl ether of neopentyl glycol copolymer grafted with epichlorohydrin terminated polyethyleneglycol methyl ether; an N,N,N'-trimethyl-1,3-propanediamine capped ethanolamine/3 (dimethylamino)propylamine/diglycidyl ether of neopentyl glycol terpolymer grafted with epichlorohydrin terminated polyethyleneglycol methyl ether polymer; a diethanolamine capped 3-(dimethylamino)propylamine/ethanolamine/poly(ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; or a mixture thereof. The metal surface may have less corrosion relative to the same type of metal surface contacted with the same acid for the same amount of time and at the same temperature. If the acid is a mineral acid, the mineral acid may be a mineral acid selected from the group consisting of hydrochloric acid, nitric acid, phosphoric acid, sulfuric acid, sulfamic acid, boric acid, hydrofluoric acid, hydrobromic acid, perchloric acid, hydroiodic acid, and any combination thereof. The polyhydroxyetheramine corrosion inhibitor may have a saturation point of at least 40% w/v in the aqueous carrier fluid. The metal surface may be positioned in a wellbore; wherein the wellbore may have a temperature of between about 100° F. to about 380° F. at the location where the metal surface is positioned. The treatment fluid may further comprise tetrahydrofurfuryl alcohol. The concentration of the polyhydroxyetheramine in the treatment fluid may be between about 0.05% (w/v) to about 5% (w/v). Alternatively, the concentration of the polyhydroxyetheramine in the treatment fluid may be between about 0.01% (w/v) to about 1% (w/v). The acid may be an organic acid. If the acid is an organic acid, the organic acid may be an organic acid selected from the group consisting of methanesulfonic acid, formic acid, acetic acid, propionic acid, butyric acid, valeric acid, caproic acid, oxalic acid, lactic acid, malic acid, citric acid, benzoic acid, carbonic acid, chloroacetic acid, alkysulfonic acid, and any combination thereof.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for inhibiting corrosion of a metal surface, the method comprises:
   providing a treatment fluid comprising an aqueous carrier fluid and a polyhydroxyetheramine corrosion inhibitor;
   contacting the metal surface with the treatment fluid, wherein the metal surface is positioned in a wellbore;
   coating at least a portion of the metal surface with the polyhydroxyetheramine corrosion inhibitor;
   contacting the coated metal surface with a mineral acid: and
   inhibiting corrosion of the coated metal surface from the mineral acid with the polyhydroxyetheramine corrosion inhibitor coating.

2. The method of claim 1, wherein the treatment fluid further comprises the mineral acid.

3. The method of claim 1, wherein the polyhydroxyetheramine corrosion inhibitor is selected from the group consisting of a diethanolamine capped ethanolamine/diglycidyl ether of neopentyl glycol copolymer grafted with epichlorohydrin terminated polyethyleneglycol methyl ether; an N,N,N'-trimethyl-1,3-propanediamine capped ethanolamine/3 (dimethylamino)propylamine/diglycidyl ether of neopentyl glycol terpolymer grafted with epichlorohydrin terminated polyethyleneglycol methyl ether polymer; a diethanolamine capped 3-(dimethylamino)propylamine/ethanolamine/poly(ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; or a mixture thereof.

4. The method of claim 1, wherein the metal surface has less corrosion relative to the same metal surface contacted with the same mineral acid for the same amount of time and at the same temperature.

5. The method of claim 1, wherein the mineral acid is a mineral acid selected from the group consisting of hydrochloric acid, nitric acid, phosphoric acid, sulfuric acid, sulfamic acid, boric acid, hydrofluoric acid, hydrobromic acid, perchloric acid, hydroiodic acid, and any combination thereof.

6. The method of claim 1, wherein the treatment fluid does not comprise any other corrosion inhibitor other than the polyhydroxyetheramine corrosion inhibitor.

7. The method of claim 1, wherein the polyhydroxyetheramine corrosion inhibitor has a saturation point of at least 40% w/v in the aqueous carrier fluid.

8. The method of claim 1, wherein the metal surface is positioned in a wellbore; wherein the wellbore has a temperature of between about 100° F. to about 380° F. at the location where the metal surface is positioned.

9. The method of claim 1, wherein the treatment fluid further comprises tetrahydrofurfuryl alcohol.

10. The method of claim 1, wherein the concentration of the polyhydroxyetheramine corrosion inhibitor in the treatment fluid is between about 0.05% (w/v) to about 5% (w/v).

11. A method for inhibiting corrosion of a metal surface, the method comprises:
    providing a treatment fluid comprising an aqueous carrier fluid, a non-polyhydroxyetheramine corrosion inhibitor, and a polyhydroxyetheramine corrosion inhibitor intensifier;
    contacting the metal surface with the treatment fluid, wherein the metal surface is positioned in a wellbore;
    coating at least a portion of the metal surface with the polyhydroxyetheramine corrosion inhibitor;
    contacting the coated metal surface with an organic acid, and
    inhibiting corrosion of the coated metal surface from the organic acid with the polyhydroxyetheramine corrosion inhibitor coating.

12. The method of claim 11, wherein the treatment fluid further comprises the organic acid.

13. The method of claim 11, wherein the polyhydroxyetheramine corrosion inhibitor intensifier is selected from the group consisting of a diethanolamine capped ethanolamine/diglycidyl ether of neopentyl glycol copolymer grafted with epichlorohydrin terminated polyethyleneglycol methyl ether polymer; an N,N,N'-trimethyl-1,3-propanediamine capped ethanolamine/3 (dimethylamino)propylamine/diglycidyl ether of neopentyl glycol terpolymer grafted with epichlorohydrin terminated polyethyleneglycol methyl ether polymer; a diethanolamine capped 3-(dimethylamino)propylamine/ethanolamine/poly(ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; or a mixture thereof.

14. The method of claim 11, wherein the metal surface has less corrosion relative to the same type of metal surface contacted with the same organic acid for the same amount of time and at the same temperature.

15. The method of claim 11, wherein the organic acid is an organic acid selected from the group consisting of methanesulfonic acid, formic acid, acetic acid, propionic acid, butyric acid, valeric acid, caproic acid, oxalic acid, lactic acid, malic acid, citric acid, benzoic acid, carbonic acid, chloroacetic acid, alkysulfonic acid, and any combination thereof.

16. The method of claim 11, wherein the concentration of the polyhydroxyetheramine corrosion inhibitor intensifier in the treatment fluid is between about 0.01% (w/v) to about 1% (w/v).

17. A system for inhibiting corrosion of a metal surface, the system comprises:
- a treatment fluid comprising a polyhydroxyetheramine, an acid, and an aqueous carrier fluid;
- mixing equipment capable of containing the treatment fluid;
- pumping equipment capable of pumping the treatment fluid into a wellbore to coast at least a portion of the metal surface with the polyhydroxetheramine; and
- the metal surface; wherein corrosion of the coated metal surface by the acid is inhibited by the polyhydroxyetheramine coating.

18. The system of claim 17, wherein the treatment fluid further comprises a non-polyhydroxyetheramine corrosion inhibitor.

19. The system of claim 17, wherein the acid is a mineral acid selected from the group consisting of hydrochloric acid, nitric acid, phosphoric acid, sulfuric acid, sulfamic acid, boric acid, hydrofluoric acid, hydrobromic acid, perchloric acid, hydroiodic acid, and any combination thereof.

20. The system of claim 17, wherein the polyhydroxyetheramine is selected from the group consisting of a diethanolamine capped ethanolamine/diglycidyl ether of neopentyl glycol copolymer grafted with epichlorohydrin terminated polyethyleneglycol methyl ether; an N,N,N'-trimethyl-1,3-propanediamine capped ethanolamine/3 (dimethylamino)propylamine/diglycidyl ether of neopentyl glycol terpolymer grafted with epichlorohydrin terminated polyethyleneglycol methyl ether polymer; a diethanolamine capped 3-(dimethylamino)propylamine/ethanolamine/poly (ethylene glycol) diglycidyl ether terpolymer grafted with epichlorohydrin terminated polyethyleneglycol methyl ether; a diethanolamine capped 3-(dimethylamino)propylamine/ethanolamine/ethylene glycol diglycidyl ether terpolymer grafted with epichlorohydrin terminated polyethyleneglycol methyl ether; or a mixture thereof.

* * * * *